(12) United States Patent
Franklin (10) Patent No.: US 8,352,584 B2
(45) Date of Patent: *Jan. 8, 2013

(54) SYSTEM FOR HOSTING CUSTOMIZED COMPUTING CLUSTERS

(75) Inventor: Jeffrey B. Franklin, Louisville, CO (US)

(73) Assignee: Light Refracture Ltd., LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/894,664

(22) Filed: Sep. 30, 2010

(65) Prior Publication Data

US 2011/0023104 A1    Jan. 27, 2011

Related U.S. Application Data

(63) Continuation of application No. 11/927,921, filed on Oct. 30, 2007, now Pat. No. 7,822,841.

(51) Int. Cl.
*G06F 15/16*     (2006.01)
*G06F 15/173*    (2006.01)
*G06F 15/177*    (2006.01)

(52) U.S. Cl. .......... 709/223; 713/153; 719/311; 726/11; 726/12; 709/224

(58) Field of Classification Search .................. 709/223, 709/224; 713/153; 719/311; 726/12, 11
See application file for complete search history.

(56) References Cited

U.S. PATENT DOCUMENTS

| 4,731,860 A | 3/1988 | Wahl |
| 4,837,831 A | 6/1989 | Gillick et al. |
| 5,079,765 A | 1/1992 | Nakamura |
| 5,185,860 A | 2/1993 | Wu |
| 5,224,205 A | 6/1993 | Dinkin et al. |
| 5,371,852 A | 12/1994 | Attanasio et al. |
| 5,649,141 A | 7/1997 | Yamazaki |
| 5,694,615 A | 12/1997 | Thapar et al. |

(Continued)

FOREIGN PATENT DOCUMENTS

WO    2009058642    5/2009

OTHER PUBLICATIONS

Lee, Dong Woo, et al., "visPerf: Monitoring Tool for Grid Computing" In Proceedings of the International Conference on Computational Science 2003 (LNCS vol. 2659/2003), Dec. 31, 2003.

(Continued)

*Primary Examiner* — Haresh N Patel
(74) *Attorney, Agent, or Firm* — Stolowitz Ford Cowger LLP (57) ABSTRACT

A computer system for hosting computing clusters for clients. The system includes clusters each including a set of computing resources and each implemented in custom or differing configurations. Each of the configurations provides a customized computing environment for performing particular client tasks. The configurations may differ due to configuration of the processing nodes, the data storage, or the private cluster network or its connections. The system includes a monitoring system that monitors the clusters for operational problems on a cluster level and also on a per-node basis such as with monitors provided for each node. The system controls client access to the clusters via a public communications by only allowing clients to access their assigned cluster or the cluster configured per their specifications and performing their computing task. Gateway mechanisms isolate each cluster such that communications within a cluster or on a private cluster communications network are maintained separate.

13 Claims, 7 Drawing Sheets

U.S. PATENT DOCUMENTS

| | | | |
|---|---|---|---|
| 5,774,650 | A | 6/1998 | Chapman et al. |
| 5,822,531 | A | 10/1998 | Gorczyca et al. |
| 5,890,007 | A | 3/1999 | Zinguuzi |
| 5,946,463 | A | 8/1999 | Carr et al. |
| 6,088,727 | A | 7/2000 | Hosokawa et al. |
| 6,363,495 | B1 | 3/2002 | MacKenzie et al. |
| 6,427,209 | B1 | 7/2002 | Brezak, Jr. et al. |
| 6,438,705 | B1 | 8/2002 | Chao et al. |
| 6,748,429 | B1 | 6/2004 | Talluri et al. |
| 6,779,039 | B1 | 8/2004 | Bommareddy et al. |
| 6,823,452 | B1 | 11/2004 | Doyle et al. |
| 6,826,568 | B2 | 11/2004 | Bernstein et al. |
| 6,854,069 | B2 | 2/2005 | Kampe et al. |
| 6,990,602 | B1 | 1/2006 | Skinner et al. |
| 6,996,502 | B2 * | 2/2006 | De La Cruz et al. .......... 702/188 |
| 7,035,858 | B2 | 4/2006 | Dinker et al. |
| 7,185,076 | B1 | 2/2007 | Novaes et al. |
| 7,188,171 | B2 | 3/2007 | Srinivasan et al. |
| 7,203,864 | B2 | 4/2007 | Goin et al. |
| 7,243,368 | B2 | 7/2007 | Ford |
| 7,246,256 | B2 | 7/2007 | De La Cruz |
| 7,269,762 | B2 | 9/2007 | Heckmann et al. |
| 7,634,683 | B2 | 12/2009 | De La Cruz |
| 7,822,841 | B2 * | 10/2010 | Franklin ....................... 709/223 |
| 2005/0039180 | A1 | 2/2005 | Fultheim |
| 2005/0060391 | A1 | 3/2005 | Kaminsky et al. |
| 2005/0108425 | A1 * | 5/2005 | Rabinovitch .................. 709/238 |
| 2005/0108518 | A1 * | 5/2005 | Pandya ........................ 713/151 |
| 2005/0159927 | A1 | 7/2005 | Cruz et al. |
| 2005/0172161 | A1 | 8/2005 | Cruz et al. |
| 2005/0228906 | A1 * | 10/2005 | Kubota ............................. 710/1 |
| 2005/0235055 | A1 * | 10/2005 | Davidson ...................... 709/223 |
| 2005/0251567 | A1 * | 11/2005 | Ballew et al. ................. 709/223 |
| 2006/0080323 | A1 | 4/2006 | Wong et al. |
| 2006/0085785 | A1 | 4/2006 | Garrett |
| 2006/0143350 | A1 * | 6/2006 | Miloushev et al. .......... 710/242 |
| 2006/0190602 | A1 | 8/2006 | Canali et al. |
| 2006/0212332 | A1 | 9/2006 | Jackson |
| 2006/0212334 | A1 | 9/2006 | Jackson |
| 2006/0230149 | A1 | 10/2006 | Jackson |
| 2006/0248371 | A1 | 11/2006 | Chen et al. |
| 2007/0028244 | A1 * | 2/2007 | Landis et al. ................. 718/108 |
| 2007/0061441 | A1 * | 3/2007 | Landis et al. ................. 709/224 |
| 2007/0067435 | A1 * | 3/2007 | Landis et al. ................. 709/224 |
| 2007/0067481 | A1 * | 3/2007 | Sharma et al. ................ 709/231 |
| 2007/0156677 | A1 | 7/2007 | Szabo |
| 2007/0156813 | A1 | 7/2007 | Galvez et al. |
| 2007/0220152 | A1 | 9/2007 | Jackson |
| 2007/0245167 | A1 | 10/2007 | De La Cruz et al. |
| 2008/0043769 | A1 | 2/2008 | Hirai |
| 2008/0070550 | A1 * | 3/2008 | Hose ............................. 455/411 |
| 2008/0086523 | A1 * | 4/2008 | Afergan et al. ............... 709/202 |
| 2008/0086524 | A1 * | 4/2008 | Afergan et al. ............... 709/202 |
| 2008/0092058 | A1 * | 4/2008 | Afergan et al. ............... 715/745 |
| 2008/0120403 | A1 * | 5/2008 | Lowery et al. ................ 709/223 |
| 2008/0177690 | A1 * | 7/2008 | Vescovi et al. .................. 706/48 |
| 2008/0216081 | A1 | 9/2008 | Jackson |
| 2009/0019535 | A1 * | 1/2009 | Mishra et al. .................. 726/12 |
| 2010/0023949 | A1 * | 1/2010 | Jackson ........................ 718/104 |

OTHER PUBLICATIONS

Peng, Liang, et al., "Performance Evaluation in Computational Grid Environments" Proceedings of the Seventh International Conference on High Performance Computing and Grid in Asia Pacific Region (HPCAsia '04) 2003 (LNCS vol. 2659/2003) Dec. 31.

International Search Report May 25, 2009, PCT/US2008/080876.

G.A. Koenig et al.; "Cluster Security with NVisionCC: Process Monitoring by Levering Emergent Properties"; http://ieeexplore.ieee/org/xpl/freeabs_all,jsp?arnumber=155853; Dec. 19, 2005.

William Yurcik et al.; "NVisionCC: A Visualization Framework for High Performance Cluster Security"; http://dl.acm.org/citation.cfm?id-1029230; Dec. 31, 2004.

International Bureau of WIPO; International Preliminary Report on Patentability and Written Opinion, PCT/US2008/080876; May 4, 2010 and May 22, 2010; 9 pages.

Stolowitz Ford Cowger LLP; Related Case Listing; Feb. 10, 2012; 1 Page.

* cited by examiner

SYSTEM FOR HOSTING CUSTOMIZED COMPUTING CLUSTERS

CROSS-REFERENCE TO RELATED APPLICATIONS

This application is a continuation of U.S. patent application Ser. No. 11/927,921, now U.S. Pat. No. 7,822,841, filed Oct. 30, 2007, which is incorporated herein by reference in its entirety.

BACKGROUND OF THE INVENTION

1. Field of the Invention

The present invention relates, in general, to distributed computing and clustered computing environments, and, more particularly, to computer software, hardware, and computer-based methods for hosting a set of computer clusters that are uniquely configured or customized to suit a number of remote customers or clients.

2. Relevant Background.

A growing trend in the field of distributed computing is to use two or more computing resources to perform computing tasks. These grouped resources are often labeled clustered computing environments or computing clusters or simply "clusters." A cluster may include a computer or processors, network or communication links for transferring data among the grouped resources, data storage, and other devices to perform one or more assigned computing processes or tasks. The clusters may be configured for high availability, for higher performance, or to suit other functional parameters. In a typical arrangement, a portion of a company's data center may be arranged and configured to operate as a cluster to perform one task or support the needs of a division or portion of the company. While a company may benefit from use of a cluster periodically on an ongoing basis, there are a number of reasons why it is often undesirable for a company to own and maintain a cluster.

As one example, High Performance Computing (HPC) clusters are difficult to setup, configure, and manage. An HPC cluster also requires numerous resources for ongoing maintenance that increases the cost and manpower associated with cluster ownership. Despite these issues, a company may require or at least demand HPC clusters (or other cluster types) to solve large problems that would take an inordinate amount of time to solve with a single computer. The need for HPC and other cluster types is in part due to the fact that processor speeds have stagnated over the past few years. As a result, many companies and other organizations now turn to HPC clusters because their problems cannot be solved more rapidly by simply purchasing a faster processor. These computer users are placed in the difficult position of weighing the benefits of HPC clusters against the resources consumed by owning such clusters. Decision makers often solve this dilemma by not purchasing clusters, and clusters have remained out of reach of some clients as the resource issues appear insurmountable.

When utilized, HPC systems allow a set of computers to work together to solve a single problem. The large problem is broken down into smaller independent tasks that are assigned to individual computers in the cluster allowing the large problem to be solved faster. Assigning the independent tasks to the computer is often the responsibility of a single node in the cluster designated the master node. The responsibilities of the master node include assigning tasks to nodes, keeping track of which nodes are working on which tasks, and consolidating the results from the individual nodes. The master node is also responsible for determining if a node fails and assigning the task of the failed node to another node to ensure that node failures are handled transparently. Communication between nodes is accomplished through a message passing mechanism implemented by every member of the cluster. Message passing allows the individual computers to share information about their status on solving their piece of the problem and return results to the master node. Currently, those who determine a cluster is worth the drain on resources purchase a cluster, host the cluster, and manage it on their premises or on site.

Unfortunately, while the number of tasks and computing situations that would benefit from HPC clusters continues to rapidly grow, HPC clusters are not being widely adopted. In part, this is because HPC clusters require the most computers of any cluster type and, thus, cause the most problems with maintenance and management. Other types of clusters that have been more widely adopted include the "load balancing cluster" and the "high availability cluster," but resources are also an issue with these clusters. A load balancing cluster is a configuration in which a server sends small individual tasks to a cluster of additional servers when it is overloaded. The high availability cluster is a configuration in which a first server watches a second server and if the second server fails, then the first server takes over the function of the second server.

The multi-cluster subsumes all other classes of clusters because it incorporates multiple clusters to perform tasks. The difficulties for managing clusters are amplified when considering multiple clusters because of their complexity. For example, if one HPC cluster consumes a set of resources, then multiple HPC clusters will, of course, consume a much larger set of resources and be even more expensive to maintain. One method proposed for managing multiple high availability clusters is described in U.S. Pat. No. 6,438,705, but this method is specific only to the managing of high availability clusters. Further, the described method requires each cluster to have a uniform design. Because it is limited to high availability clusters, the owner would not have an option to incorporate multiple cluster types, such as HPC or load-balancing clusters, within the managed multi-cluster. Additionally, the suggested method does not solve one of the fundamental difficulties associated with cluster usage because it requires the cluster to be owned and operated by the user and to remain on the client's property or site. Other discussions of cluster management, such as those found in U.S. Pat. Nos. 6,748,429, 5,371,852, and 5,946,463 generally describe a single cluster configuration and do not relate to operating multi-clusters. In all of these cases, the burden of managing, monitoring, and hosting the cluster remains with the user of the cluster who owns the cluster who must maintain the cluster on their premises.

Hence, there remains a need for systems and methods for providing clusters to users or "clients" such as companies and other organizations that provide the computational assets or power that the clients demand while not presenting an unacceptable burden on the clients' resources. Preferably, these systems and methods would be effective in providing a cluster that is adapted to suit a particular need or computing task rather than forcing a one-size-fits-all solution upon a cluster user.

SUMMARY OF THE INVENTION

To address the above and other problems, the present invention provides methods and systems for hosting a plurality of clusters that are each configured for a particular task or computing application presented by a user or client. In particular, the present invention provides for configuration, access control, and monitoring of multiple customized clusters that are hosted for one or more remote clients. For example, system or cluster configuration data may be generated for a cluster based on input from a client or user regarding their computing needs and planned tasks, and this configuration data may be used to configure a cluster particularly for that client. The customized cluster is then hosted at a central hosting facility and is made accessible to that client, such as via a public network such as the Internet.

More particularly, a computer system or network is provided for hosting computing clusters for clients or customers (such as businesses and organizations that desire a cluster but do not want to own, operate, and maintain one on their premises). The system includes a first cluster including a set of computing resources such as processing nodes, data storage, and a private communications network that is arranged or implemented in a first configuration. The system also includes a second cluster having a set of computing resources in a second configuration, which differs from the first configuration (e.g., both may be HPC clusters but be configured to handle a different client-assigned or defined task). The first configuration provides a first computing environment for performing a first client task while the second configuration provides a second computing environment for performing a second client task (which typically will differ from the first client task). The first and second configurations may differ due to configuration of the processing nodes in the clusters, based on configuration of the data storage, based on the private communications network or its connections, or based on software modules provided on the nodes, or based on other hardware or software components and/or configurations.

The system may further include a monitoring system that monitors the clusters for connectivity and availability or other operational problems on a cluster level and, typically, on a per-node basis (such as with monitors provided for each node) and issues alerts to operations and/or maintenance personnel based on identified issues. The system also provides clients or client systems access to the clusters via a public communications network that is linked, such as via a firewall, to a private company network to which the clusters are linked, such as via a gateway mechanism. The system is adapted to control access of the clients to the clusters such that a client can only access particular ones of the clusters (e.g., the cluster that has been configured according to their specifications or computing parameters or to perform their computing tasks). For example, the firewall mechanism may act to determine which cluster a client is attempting to access and then to determine whether the requesting client has permission or authorization to access that cluster. The gateway mechanisms operate, in part, to isolate each cluster such that communications within a cluster such as on the private cluster communications network are separated (e.g., do not have to share bandwidth of a single system network).

DETAILED DESCRIPTION OF THE PREFERRED EMBODIMENTS

The present invention is directed to methods and systems for hosting multiple clusters or clustered computing environments such that each of the clusters is configured to match or address a particular client or user computing task or problem (e.g., in response to a request for a hosted cluster from a client that identifies their computing and associated requirements). The cluster systems of the invention differ from prior clusters in part because they are physically provided at one or more locations that are remote from the processing user or client's facilities (i.e., the computing resources are not owned and operated by the user). The client may establish processing parameters that are used to configure a cluster in the system in a manner that suits their needs and, then, access their hosted cluster from a remote location via a communications network such as the Internet or other network.

The hosted cluster systems and hosting methods of the invention are described herein in relation to three issues associated with hosting multiple customized clusters that were identified by the inventor. Particularly, the systems and methods of the invention address issues associated with arranging the clusters in a consistent and useful manner and of controlling client access to the clusters. Additionally, the systems and methods address issues involved with monitoring the individual cluster components. Examples of solutions to each of these problems are described in the embodiments shown in FIGS. 2-5.

It will be clear from the following description that the managed and hosted clusters of the various embodiments can be used to give a client control over the design and configuration of a cluster while removing the impediments required by traditional clusters consuming the client's real-estate and requiring nearly constant maintenance. Additionally, the hosting options presented with the hosting methods and hosted cluster systems relieve the client of many burdens and opens up future potential avenues for cluster usage. Furthermore, the hosted multi-clusters have the following additional advantages. Providing a hosted cluster to a client does not lock the client into using any one vendor for cluster computing parts because the cluster components can be from any vendor and can be modified and replaced as appropriate to support client needs. Hosted clusters allow for easily expandable clusters since each cluster is isolated or is maintained as a standalone unit in communication with a network for communications with a corresponding client and monitoring equipment and/or software modules. It provides for constant monitoring of the cluster because each cluster is hosted and managed.

Figure 1:
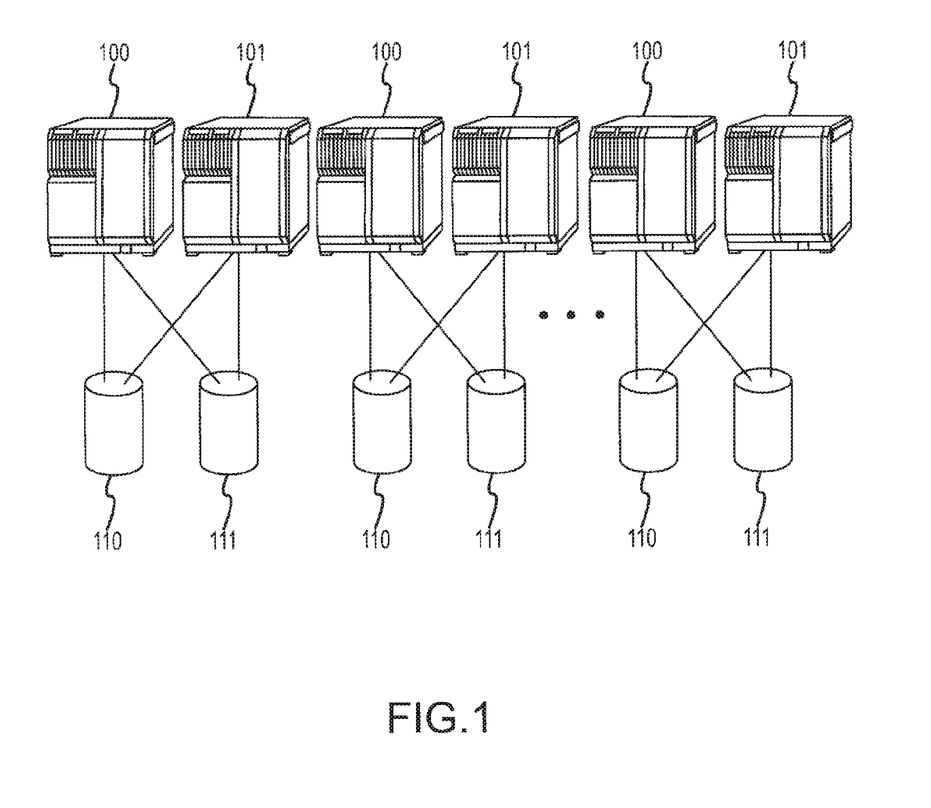
FIG. 1 illustrates a multi-cluster system available prior to the invention.

Before the invention, the use of multiple cluster systems was known, but these multi-cluster systems were typically limited in ways that hindered their use and adoption. For example, prior multi-cluster computing systems were limited to systems owned and operated by a single user (e.g., to being located upon the owner's facilities), limited to a single configuration such as all clusters being a particular configuration to support a similar processing task, limited to a particular type such as all being high availability, or otherwise limited in their function and/or configuration. For example, one prior multi-cluster system having high availability clusters is described in U.S. Pat. No. 6,438,705 and is illustrated in FIG. 1. In this diagram, several clusters are shown that each consist of a primary node 100 and a secondary cluster node 101 connected to a primary storage system 110 and secondary storage system 111. As discussed above, this cluster system design requires each cluster to have a uniform design with like hardware and software. The described cluster system limits or even prevents the ability to have multiple cluster types (such as a HPC cluster and a load balancing or high availability cluster) within a single managed multi-cluster. In the patent description, the cluster system is also restricted to high availability clusters and not applicable to other cluster types such as HPC or load balancing. Significantly, this system also does not solve the fundamental difficulties associated with prior cluster systems, i.e., the clients are required to host and manage the clusters that are located on their site or in their facilities.

Figure 2:
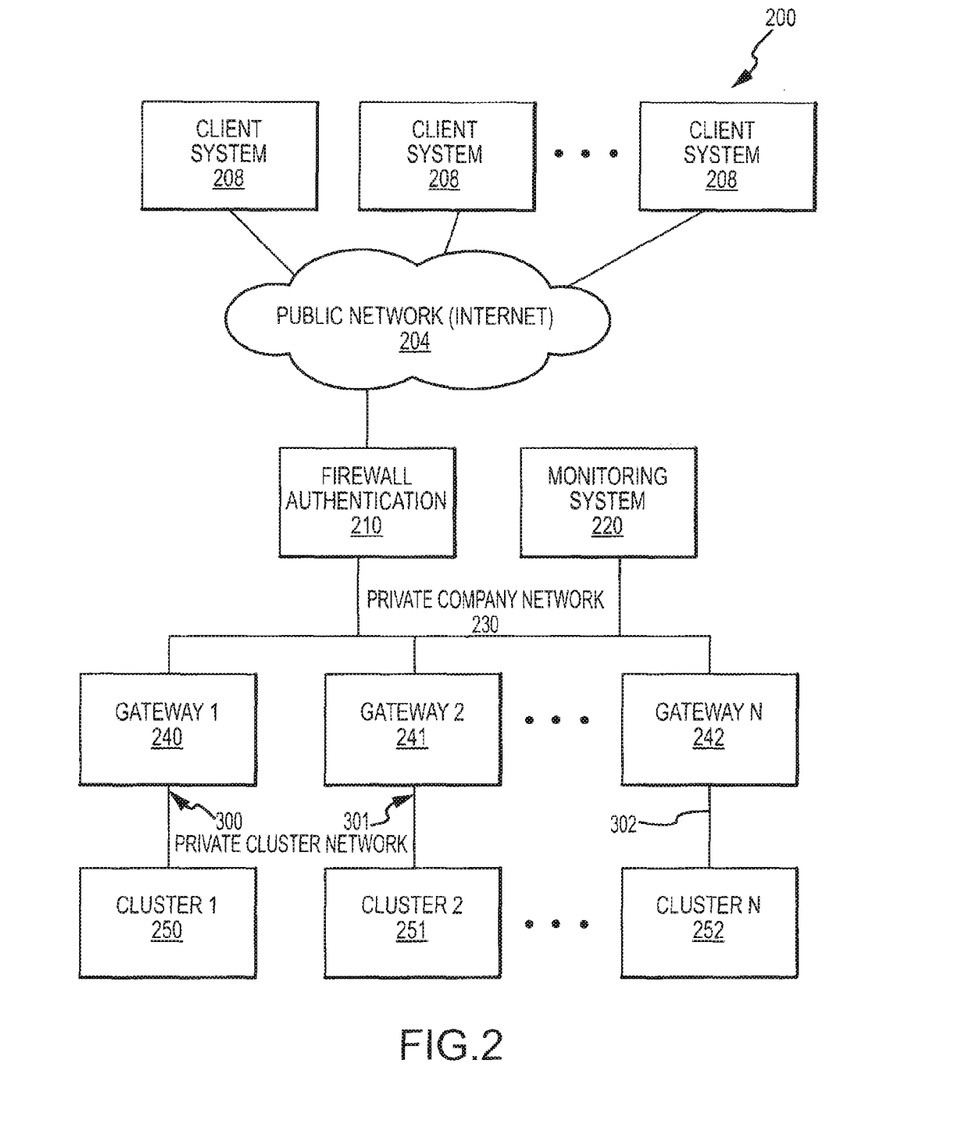
FIG. 2 is a functional block diagram illustrating a hosted cluster system of one embodiment of the invention.

In FIG. 2, one preferred embodiment of a hosted cluster system 200 is illustrated such as it may be provided at a hosting facility typically remote from users or clients (i.e., from their accessing nodes or systems 208). The system 200 has, or is connected to, a public network 204 (e.g., a wired and/or wireless digital communications network including the Internet, a LAN, a WAN, or the like), which in turn is connected to a firewall and authentication system 210. The authentication system 210 connects to the company network 230, which has a monitoring system 220 for all the customized clusters 250, 251, 252. The company network 230 also has gateways 240, 241, 242, such as routers, to each unique cluster 250, 251, 252. On the other side of each gateway 240, 241, 242 is a private network 300, 301, 302 for the individual clusters 250, 251, 252.

The embodiment shown with system 200 provides efficient separation of the individual cluster network traffic to prevent one cluster from interfering with other clusters. The traffic separation is achieved through the gateway 240, 241, and/or 242 located between each cluster 250, 251, and 252 and the company network 230. Each gateway 240, 241, 242 is configured with software and hardware to apply a standard set of rules to only permit traffic destined for its corresponding cluster to pass through from the company network 230 while keeping all cluster traffic internal to the cluster. With this cluster separation, the internal cluster configuration is abstracted from the primary company network 230 allowing the configuration of each cluster to be selected and maintained independently from the other clusters on the network 230. By keeping all clusters 250, 251, 252 connected to a common network 230 through the gateways 240, 241, 242, it is significantly easier to administer the many individual clusters and it also gives the clusters 240, 241, 242 a common destination for any monitoring information (e.g., to monitoring system 220 via common network 230).

Access control to the individual clusters 250, 251, 252 is governed by the firewall and authentication mechanism 210. This mechanism 210 may be implemented with several configurations to achieve the goal of ensuring that clients have access to their cluster, and only to their cluster. Each of these configurations performs two primary steps: (1) ensuring that an incoming connection goes to the correct Cluster and (2) ensuring that the incoming user has access to that cluster (e.g., that a client or customer operating a client node or system 208 attempting a communication or connection with their cluster is directed to the proper one of the clusters 250, 251, or 252 and that the system 208 or, more typically, the user of the system 208 has access to that particular cluster 250, 251, or 252).

One useful configuration of the system 200 and mechanism 210 is to give each cluster 250, 251, 252 its own public address. This enables the firewall portion of mechanism 210 to know that all incoming connections to that specific public address are sent to a node (not shown in FIG. 2) on a particular cluster 250, 251, 252. Once the client system 208 is connected to a node on a cluster 250, 251, or 252, that node is then responsible for user authentication to grant access (e.g., a node is provided within each cluster 250, 251, 252 that has the proper software and/or hardware to authenticate accessing users). Another configuration of the system 200 and mechanism 210 is to have each client 210 connect to a different service on the firewall 210, such as a TCP/IP port. The firewall 210 will then know which services are for which clusters out of the many clusters 250, 251, 252 on the network 230. It is then able to route the connection to a node on the desired cluster 250, 251, or 252 to perform user authentication. Another configuration for system 200 and mechanism 210 is for client system 208 to connect to a common service on the firewall 210 and have the firewall 210 authenticate the user. This configuration requires the firewall 210 to setup a special user environment on the firewall 210 that will only allow the user of the system 208 to communicate with their cluster 250, 251, or 252 and no other clusters. This is accomplished through common virtual machine technology. All of these possible configurations can co-exist together and are not mutually exclusive. Many other configurations exist that provide per-cluster and per-user authentication, and the above-described configurations for the system 200 and mechanism 210 are merely provided as examples.

Significantly, each individual cluster 250, 251, 252 can have any configuration requested by the client of that cluster. For example, companies or organizations may face differing computing challenges and have different needs for a cluster, and the system 200 is intended to represent generally a hosted cluster system 200 in which a plurality of clusters 250, 251, 252 are provided for access by client systems 208 via public network 204 (or another network). Hence, the clusters 250, 251, 252 are located remotely from the customer or user's facilities or sites (e.g., the system 200 excluding the client remote systems 208 and all or portions of the network 204 may be located at a hosting facility or facilities) and are not typically owned by the customer or user but instead are provided on an as-needed basis from an operator of the system 200 (such as by leasing use of a cluster 250, 251, or 252). As a result the customer or user is not required to operate and maintain a data center filled with clusters. Further, in contrast to prior practice, each of the clusters 250, 251, 252 is independent and can be configured to suit the needs of the user or customer. For example, each of the cluster users or clients may need a cluster to perform a particular and differing task. Previously, a data center would be provided with clusters of a particular configuration, and the task would be performed by that configured cluster.

In contrast, the system 200 is adapted such that each of the clusters 250, 251, 252 may have a differing configuration with such configuration being dynamically established in response to a user or customer's request so as to be better suited to perform their task. For example, the task may be handled better with a cluster configuration designed to provide enhanced processing or enhanced data storage. In other cases, the task may best be served with a cluster configured for very low latency or a cluster with increased bandwidth for communications between nodes and/or accessing storage.

The task parameters and needs of a user are determined as part of personal interview of the customer and/or via data gathered through the a data collection screen/interface (not shown) with the system 200. This user input defines the task characteristics or computing parameters, and these are processed manually or with configuration software to select a cluster configuration that matches or suits the customer's needs. The selected cluster configuration (or configuration data) is then used to customize one or more of the clusters 250, 251, 252 to have a configuration for performing tasks assigned by the customer such as by use of node or system 208. The customer accesses their assigned cluster(s) 250, 251, 252 via the public network 204 and authentication and firewall mechanism 210 through use of a client system 208 as discussed above (or, in some cases, by providing computing requests to an operator of the system 200 in physical form for entry via the monitoring system 220 or the like or by digital communications with such an operator).

Figure 3A:
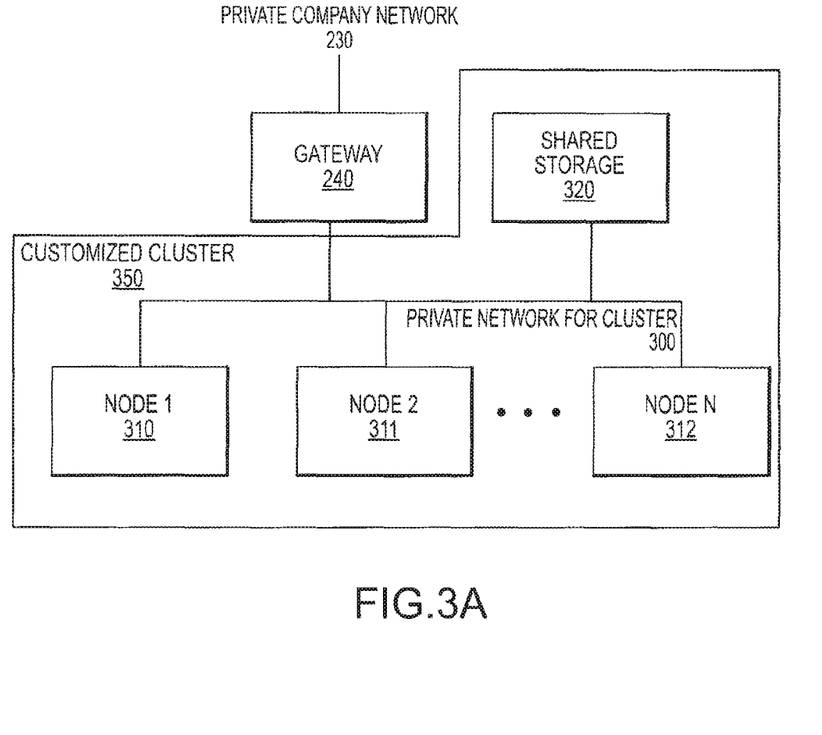
FIGS. 3A-3C illustrate three representative embodiments of clusters that are configured to provide customization to suit a particular task or computing application (e.g., to meet the particular needs of a requesting customer)

One possible common configuration for the clusters 250, 251, 252 of system 200 such as cluster 250 is shown in FIG. 3A with customized cluster 350, which is linked to the private company network 23 via gateway 240. The cluster 350 is shown as having a plurality of nodes 310, 311, 312 that are all connected to a single private communication network 300 for the cluster 350. The cluster 350 also has a dedicated storage node 320 linked to this private network 300, and storage node is used for common storage or data that is shared between the nodes 310, 311, 312 of the cluster 350. Another useful configuration for clusters is shown with customized cluster 351 in FIG. 3B, which modifies the cluster structure of cluster 350 of FIG. 3A. The customized cluster 351 may be used for cluster 251 of system 200 to service one of the client systems 208 (or a cluster user that operates one of the systems 208 to access the cluster 251). The configuration of the cluster 351 as shown involves providing a storage network 340 that is separated from the inter-node communication network 301.

Figure 3B:
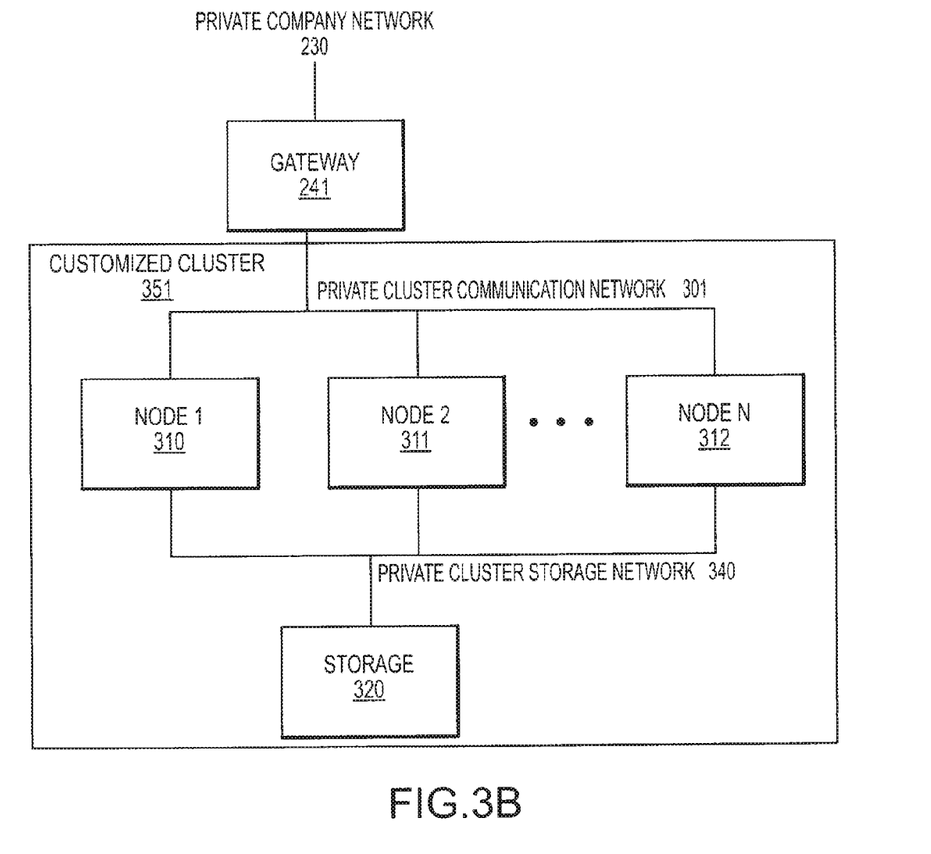
Figure 3C:
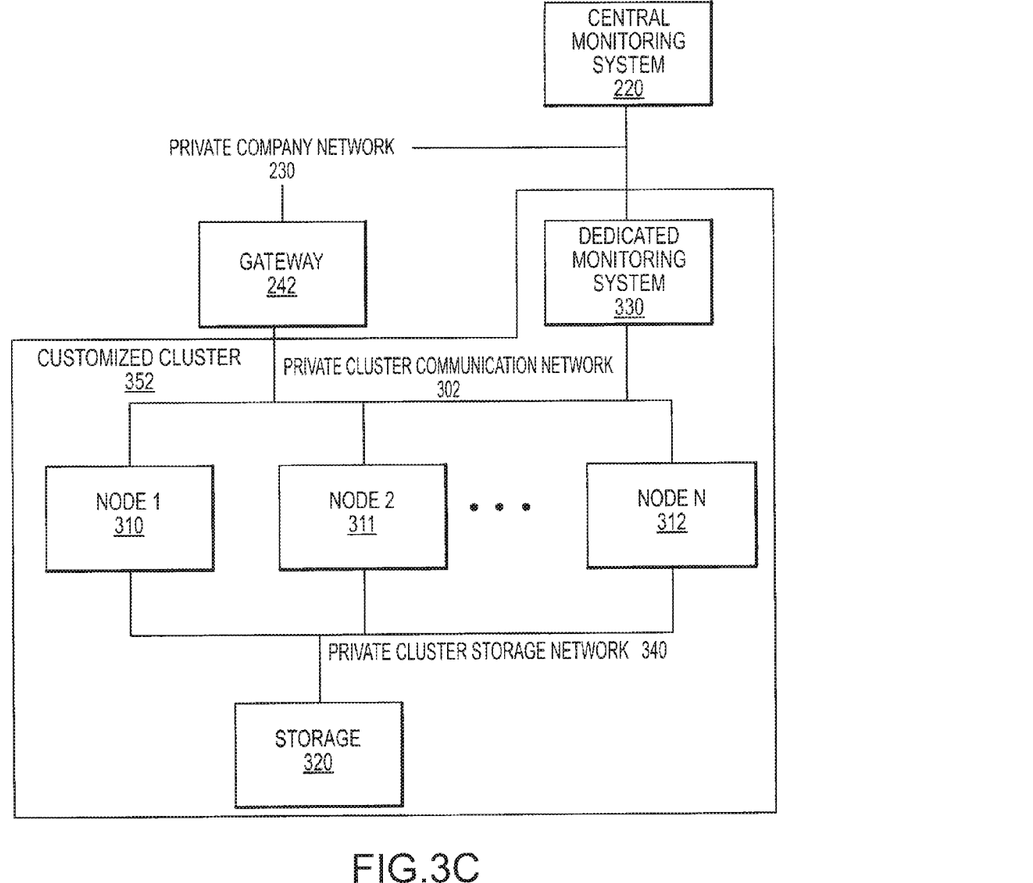

FIG. 3C illustrates that a customized cluster 352, which may be used for cluster 252, may be configured to include a per-cluster monitoring system or dedicated monitoring system 330 for that specific cluster 352 which reports the state of the cluster 352 to the central monitoring system 220. Such a dedicated monitoring system 330 may also be provided in a cluster customized for a customer as shown in the cluster 350 of FIG. 3A. In FIGS. 3A-3C, networks 300, 301, 302, 340 may be implemented using a wide variety of digital communications network technologies such as different network types including, but not limited to, Gigabit Ethernet, 10 Gigabit Ethernet, Infiniband™, or Myrinet™, with the selection often being based upon the task or computing parameters provided by the cluster user or customer (e.g., need for low latency or bandwidth to access storage or communicate among nodes of a cluster).

The monitoring system described has two main components: a per-node monitoring system (not shown), such as the Intelligent Platform Management Interface (IPMI), that monitors the hardware and software components on each cluster node and a central monitoring system 220 and 330 that monitors the network connectivity of each node along with verifying that each nodes' per-node monitoring system is functioning. Each node reports its status back to the main monitoring system 220, 330 through a common mechanism, such as the Simple Network Management Protocol (SNMP).

The individual cluster configurations requested by the client and implemented in the system 200 do not affect the overall network design due to the isolation of each cluster, i.e., using the gateways 240, 241, 242 as described previously. Access to each of the many clusters 250, 251, 252 of system 200 is likewise not affected by the individual cluster configurations since primary access is managed through the firewall and authentication mechanism 210.

Regarding operation of a hosted cluster system with reference to FIG. 2, each cluster 250, 251, 252 is customized to unique client specifications. The customized clusters 250, 251, 252 (e.g., with cluster configurations such as shown in FIG. 3A-3C) are then assembled and connected to a common network 230 private to the hosting company or service provider. When a client connects with a system 208 to their cluster 250, 251, or 252 through the public network 200, such as the Internet, they are authenticated by the firewall and authentication system 210, which determines their assigned and customized cluster 250, 251, or 252. At this point, they are connected to their cluster 250, 251, or 252 through the gateway 240, 241, 242 provided for that particular cluster. The gateway 240, 241, 242 is responsible for ensuring that network traffic for one cluster does not interfere with network traffic for another cluster. The gateway 240, 241, 242 also ensures that a client cannot gain access to another client's cluster (e.g., if a client system 208 or a user of system 208 has proper credentials for accessing cluster 252 but not the other clusters 250, 251 the gateway 242 will act to block the client's cluster 252 from accessing these clusters 250, 251). Upon being granted access to their cluster, a client is then able to submit (e.g., by operation of a client system 208 or by other methods) processing jobs to the cluster 250, 251, or 252, perform any specific setup for those jobs, and transfer data to and from their cluster 250, 251, 252 (e.g., via network 204, mechanism 210, private network 230, and an appropriate gateway 240, 241, or 242). The client can also be given permission to visit the hosting facility and connect directly to the cluster 250, 251, 252, if necessary. The client can also perform any other operations on the cluster 250, 251, 252 as necessary for running their jobs or maintaining their cluster 250, 251, 252.

Figure 5:
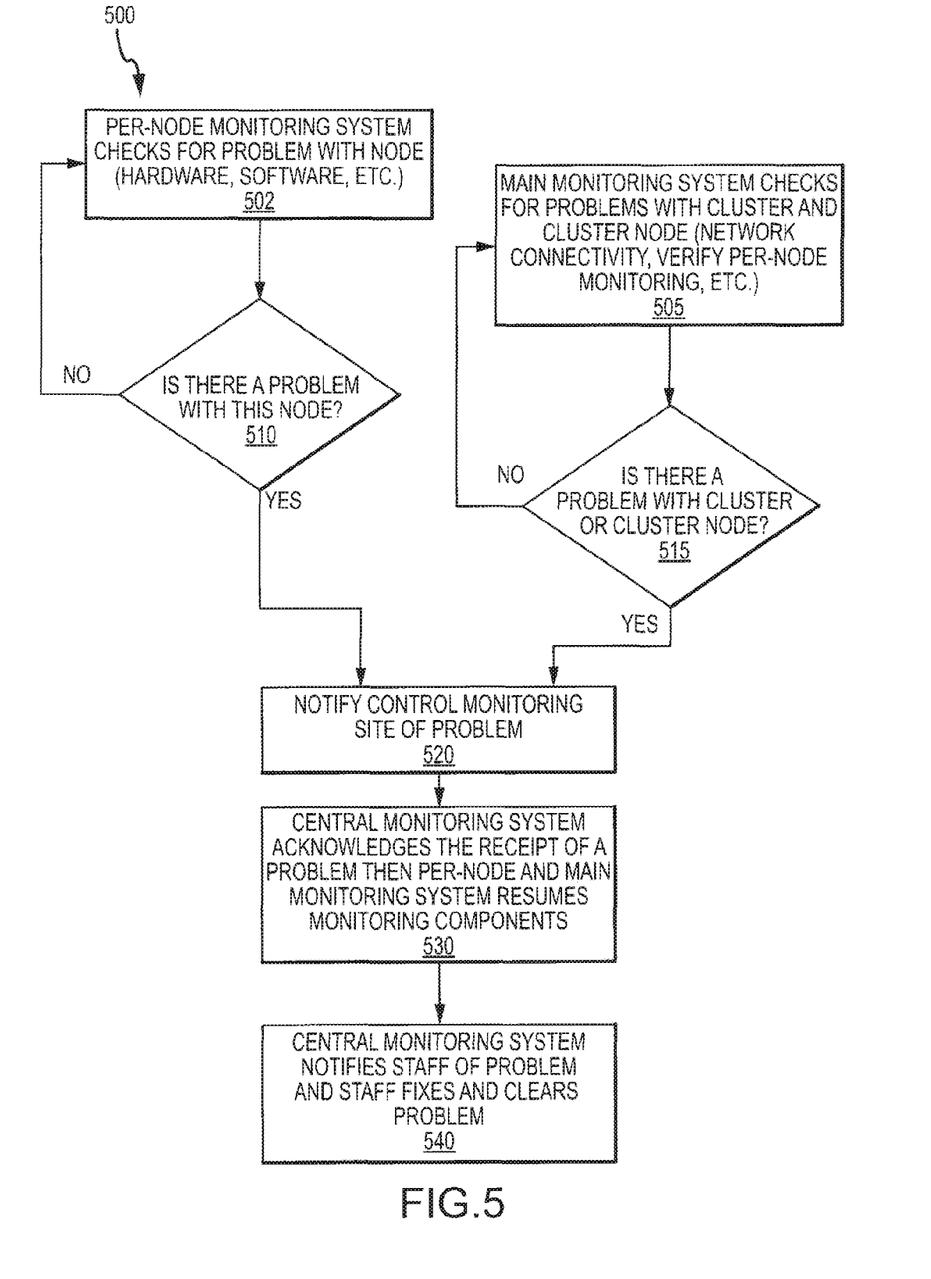
FIG. 5 is a flow diagram representing a monitoring process implemented in a hosted cluster system in one embodiment of the invention for monitoring operation of multiple, customized clusters.

The monitoring system 220 may be implemented with hardware and/or software to perform the monitoring method 500 shown in FIG. 5. Functionally the system 220 may be thought of as comprising two primary systems: a per-node monitoring system, such as IPMI, that monitors the hardware and software of the node in which it is provided (i.e., in a step 502 of method 500) and a main monitoring system 220 that monitors the network availability of each node and verifies that their per-node monitoring systems are functioning (i.e., as shown with step 505 of method 500). When the per-node monitoring system detects a problem with the node hardware or software at 510 or the main monitoring system 220 (or dedicated system 330) detects a problem with node availability or the nodes per-node monitoring system at 515, they operate to notify the central monitoring system 220 via a mechanism, such as SNMP, of the problem at 520. When the central monitoring system 220 acknowledges the problem, the per-node or main monitoring system 220 (or 330) resumes monitoring their components at 530. The monitoring process 500 typically would be operated on an ongoing manner for a cluster system such as system 200 (e.g., 24 hours a day and 7 days a week).

Once the central monitoring system 220 has acknowledged the problem, the staff of the hosting facility (e.g., where the system 200 is located, operated, and maintained) is then notified of the problem such as via wired or wireless communication (e.g., via e-mail, paging, or other notification methods). The notification may indicate where the problem is physically or functionally located (e.g., which cluster, which node within that cluster, and the like). The staff or operator is then responsible for solving the problem and clearing the problem from the central monitoring system at 540. A cluster 250, 251, 252 may be configured to have a per-cluster monitoring system 330, in which case, that system 330 is responsible for monitoring the operations of only that cluster but still sends the information to the central monitoring system 220. The monitoring data is collected from the systems 330 such as via a specific request by the monitoring system 220 for the status of each component or the components periodically send the monitoring system 220 their status. Either mechanism along with many other methods results in an effective monitoring system and process for a hosted cluster system 200. The clients have the option of having additional monitoring components on each node to monitor additional components as requested by the client. Since SNMP is very expandable and configurable, the additionally monitored components easily integrate into the existing system 200.

Figure 4:
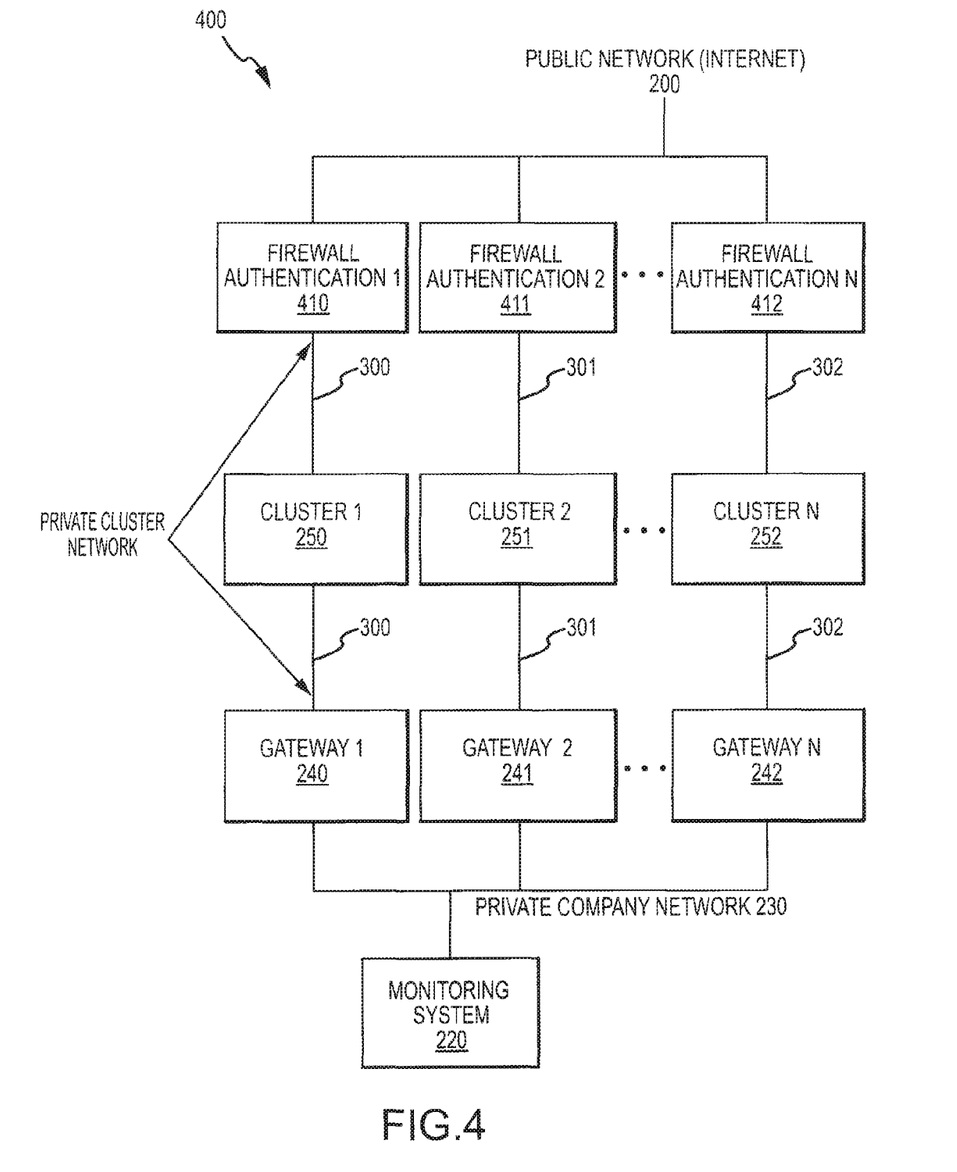
FIG. 4 illustrates another embodiment of a hosted cluster system of the invention in which dedicated firewall and authentication mechanisms or systems are provided for each cluster.

Numerous cluster arrangements and embodiments are possible given these components. The system design shown in FIG. 2 has a central authentication and firewall system 210; however, the authentication and firewall system 210 may be provided on a per-cluster basis, giving each cluster 250, 251, 252 its own firewall and authentication system. Such a system 400 may be configured as shown in FIG. 4. The system 400 includes clusters 250, 251, 252, gateways 240, 241, 242 between a private company network 230 and monitoring system 220 and the clusters, and private cluster networks 300, 301, 302. In the system 400, a firewall and authentication system 410, 411, 412 is provided for each cluster 250, 251, 252. Each firewall and authentication system 410, 411, 412 is configured to only allow a particular client (or clients if more than one client were provided access to a particular customized cluster) to access the corresponding cluster 250, 251, 252. In such a configuration, the firewall and authentication system 410, 411, 412 connects the public network 200 to the private cluster network 300, 301, 302. In this situation, the gateway 240, 241, 242 is used to connect the private cluster network 300, 301, 302 to the private company network 230, which has the monitoring system 220.

The embodiment of system 200 shown in FIG. 2 shows a single firewall and authentication 210 system. Another embodiment of a hosted cluster system, though, may include a plurality of these firewall and authentication systems to accommodate many clients (or client systems 208) accessing their clusters simultaneously. Another embodiment of the hosted cluster systems of the invention is to provide a plurality of monitoring systems such as system 220, such as when one system is determined to be insufficient to monitor all of the clients cluster components.

From the description of this system, a number of advantages of hosting clusters over traditional multi-cluster arrangements will be apparent to those skilled in the art. Clusters in the hosted cluster systems are custom built for the clients instead of merely providing a collection of identical clusters. Clients may have unlimited usage of their cluster because their cluster is not shared with any other clients so as to perform multiple tasks or computing applications (although there may be some applications where two clients or users may partner to solve a particular task, which may result in two or more users being able to access a single customized cluster adapted for the partnership's task). The hosted cluster systems are adapted to allow expansion to include nearly any number of clusters. The systems described herein prevent one client from accessing another client's cluster as a result of the gateways between each cluster. In the hosted cluster systems, clusters can each have a unique design that is independent from the other clusters due to the arrangement of the communication networks, access devices, and monitoring components. Clients do not need to concern themselves with maintenance and monitoring of their cluster(s). Since the clusters are hosted and configured on an as-needed basis (or for a particular task and/or for a contracted period of time), the hosted cluster systems can be operated so as to make clusters and clustered computing environments available to clients who may not have the resources (e.g., a small or even large business or organization may lack real estate for a computer clusters, lack the needed communications and power infrastructure, and/or lack personnel to perform constant maintenance) to purchase an on-site cluster.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the client can request clusters of multiple types, such as HPC and load balancing clusters; and the monitoring process can be performed in any order desired.

The above description is not considered limited to a particular type of cluster or to particular hardware and/or software components used to form a computing cluster. Further, the communication devices and networks may be varied to practice the invention. However, it may be useful at this point to provide further discussion of the components that may be used to implement hosted cluster systems and networks of the present invention. Clusters (which may also be called distributed computing systems) may include two or more nodes, which may be employed to perform a computing task. A node is a group of circuitry and electronic components designed to perform one or more computing tasks. A node may include one or more processors (e.g. Intel Xeon™ or AMD Opteron™), memory, and interface circuitry, or any other additional devices requested by a client. A cluster may be defined as a group of two or more nodes that have the capability of exchanging data. A particular computing task may be performed upon one node, while other nodes in the cluster perform unrelated computing tasks. Alternatively, portions of a particular computing task may be distributed among the nodes to decrease the time required to perform the computing task as a whole. A processor is a device configured to perform an operation upon one or more operands to produce a result. The operations may be performed in response to instructions executed by the processor. Clustering software is often implemented on top of an operating system, and such clustering software controls operation of the nodes on the various assigned tasks in a particular manner (e.g., based on the configuration of the hardware and software). The use of the term "configuration" with regard to a cluster is intended to encompass not only the physical components selected for a cluster and their interconnections with each other in the cluster and the topology of the cluster, but, at least in some cases, configuration also includes configuration of the software running on the computing resources of the cluster which may include any clustering software utilized to manager the cluster.

Nodes within a cluster may have one or more storage devices coupled to the nodes. A storage device is a persistent device capable of storing large amounts of data. For example, a storage device may be a magnetic storage device such as a disk device or an optical storage device such as a compact disc device. Nodes physically connected to a storage device may access the storage device directly. A storage device may be physically connected to one or more nodes of a cluster, but the storage device need not necessarily be physically connected to all the nodes of a cluster. In some clusters, a node not physically connected to a storage device may indirectly access the storage device via a data communication link connecting the nodes. Accordingly, a node may have access to one or more local, global, and/or shared storage devices within a cluster.

I claim:

1. A computer system, comprising:
a private communications network linked to a public communications network;
a first cluster comprising a set of computing resources, including at least one hardware processor, in a first configuration, wherein the first cluster is communicatively linked to the private communications network;
a second cluster comprising a set of computing resources, including at least one hardware processor, in a second configuration, wherein the second cluster is communicatively linked to the private communications network; and
a monitoring system to monitor operations of the first cluster and the second cluster for communications problems;
wherein the first configuration differs from the second configuration;
wherein the first configuration provides a first computing environment to perform a first client task and the second configuration provides a second computing environment to perform a second client task; and
wherein the computing resources comprise processing nodes, data storage shared by the processing nodes, and at least one communications network to link the processing nodes to each other and to the data storage;
wherein the first cluster establishes communications between the set of computing resources of the first cluster and a first gateway communicatively linked between the first cluster and the private communications network;
wherein the second cluster establishes communications among the set of computing resources of the second cluster and a second gateway communicatively linked between the second cluster and the private communications network;
wherein communications between the first cluster and the second cluster are isolated;
wherein the first cluster is a high performance cluster; and
wherein the second cluster is a high performance cluster.

2. The system of claim 1, wherein the first configuration differs from the second configuration based on configuration of the processing nodes in the first cluster or the second cluster.

3. The system of claim 1, wherein the first configuration differs from the second configuration based on configuration of the data storage in the first cluster or the second cluster.

4. The system of claim 1, wherein the first configuration differs from the second configuration based on configuration of the at least one communications network provided in the first cluster or the second cluster.

5. The system of claim 1, wherein the monitoring system:
identifies operational or connectivity problems based on the monitoring; and
issues an alert in response to the identified operational or connectivity problems indicating a corresponding one of the first cluster or the second cluster or a combination thereof associated with the identified operational or connectivity problems.

6. The system of claim 5, wherein the monitoring system:
monitors the first and second clusters to identify the operational and connectivity problems; and
monitors for each node of the first cluster and for each node of the second cluster to check for hardware or software problems within a particular node and to report the hardware or software problems to the main monitor.

7. The system of claim 6,
wherein each of the first cluster and the second cluster comprise a corresponding main monitor; and
wherein the monitoring system further comprises a central monitoring system in communication with the main monitors corresponding to the first cluster or the second cluster.

8. The system of claim 1, further comprising means, positioned between the public communications network and the first cluster and the second cluster, to:
limit access to the first cluster to communication access from a first client associated with the first client task; and
limit access to the second cluster to communication access from a second client associated with the second client task.

9. The system of claim 1,
wherein the public communications network is configured to be accessible by clients accessing the first cluster or the second cluster; and
wherein the system further comprises a monitoring system linked to the private communications network and configured to monitor operation of the first cluster or the second cluster.

10. A computer system, comprising:
a firewall communicatively linked to a public network and a private network;
a first private cluster network comprising:
a first high performance computing (HPC) cluster comprising a set of computing resources comprising at least one processing device in a first configuration; and
a first gateway communicatively linked between the first HPC cluster and the private network;
a second private cluster network comprising:
a second HPC cluster comprising a set of computing resources in a second configuration; and
a second gateway communicatively linked between the second HPC cluster and the private network; and
a monitoring system to monitor operation of the first private cluster network and the second private cluster network;
wherein the first configuration differs from the second configuration;
wherein the first configuration provides a first computing environment to perform a first client task;
wherein the second configuration provides a second computing environment to perform a second client task;
wherein the firewall limits communications from a first client associated with the first client task to connections with the first cluster;
wherein the firewall limits communications from a second client associated with the second client task to connections with the second cluster; and
wherein communications between the first HPC cluster and the second HPC cluster are isolated.

11. The system of claim 10,
wherein the computing resources of each of the first HPC cluster or the second HPC cluster comprise processing nodes, data storage shared by the processing nodes, and at least one communications network linking the processing nodes to each other and to the data storage; and wherein the first configuration differs from the second configuration based on configuration of the processing nodes in the first HPC cluster or the second HPC cluster.

12. The system of claim 11, wherein the first configuration differs from the second configuration based on configuration of the data storage in the first HPC cluster or the second HPC cluster.

13. The system of claim 11, wherein the first configuration differs from the second configuration based on configuration of the at least one communications network provided in the first HPC cluster or the second HPC cluster.

* * * * *

UNITED STATES PATENT AND TRADEMARK OFFICE
CERTIFICATE OF CORRECTION

PATENT NO. : 8,352,584 B2
APPLICATION NO. : 12/894664
DATED : January 8, 2013
INVENTOR(S) : Franklin It is certified that error appears in the above-identified patent and that said Letters Patent is hereby corrected as shown below:

On the Title Page, in item (57), under "ABSTRACT", in Column 2, Line 14, delete "per" and insert -- as per --, therefor.

On the Title Page, in item (57), under "ABSTRACT", in Column 2, Line 17, delete "separate." and insert -- separately. --, therefor.

In the Specifications

In Column 5, Line 12, delete "a HPC" and insert -- an HPC --, therefor.

In Column 5, Line 54, delete "clusters 240, 241, 242" and insert -- clusters 250, 251, 252 --, therefor.

In Column 5, Line 63, delete "Cluster" and insert -- cluster --, therefor.

In Column 6, Line 15, delete "client 210" and insert -- client 208 --, therefor.

In Column 7, Line 22, delete "23" and insert -- 230 --, therefor.

In Column 8, Line 11, delete "200," and insert -- 204, --, therefor.

In Column 8, Line 46, delete "with step" and insert -- in step --, therefor.

In Column 10, Line 57, delete "manager" and insert -- manage --, therefor.

In the Claims

In Column 11, Line 12, delete "including" and insert -- comprising --, therefor.

In Column 11, Line 16, delete "including" and insert -- comprising --, therefor.

Signed and Sealed this
Fourth Day of June, 2013

Teresa Stanek Rea
*Acting Director of the United States Patent and Trademark Office*